J. H. DEAN.
VOTING MACHINE.
APPLICATION FILED APR. 1, 1907. RENEWED MAR. 29, 1915.
1,158,643.
Patented Nov. 2, 1915.
7 SHEETS—SHEET 3.
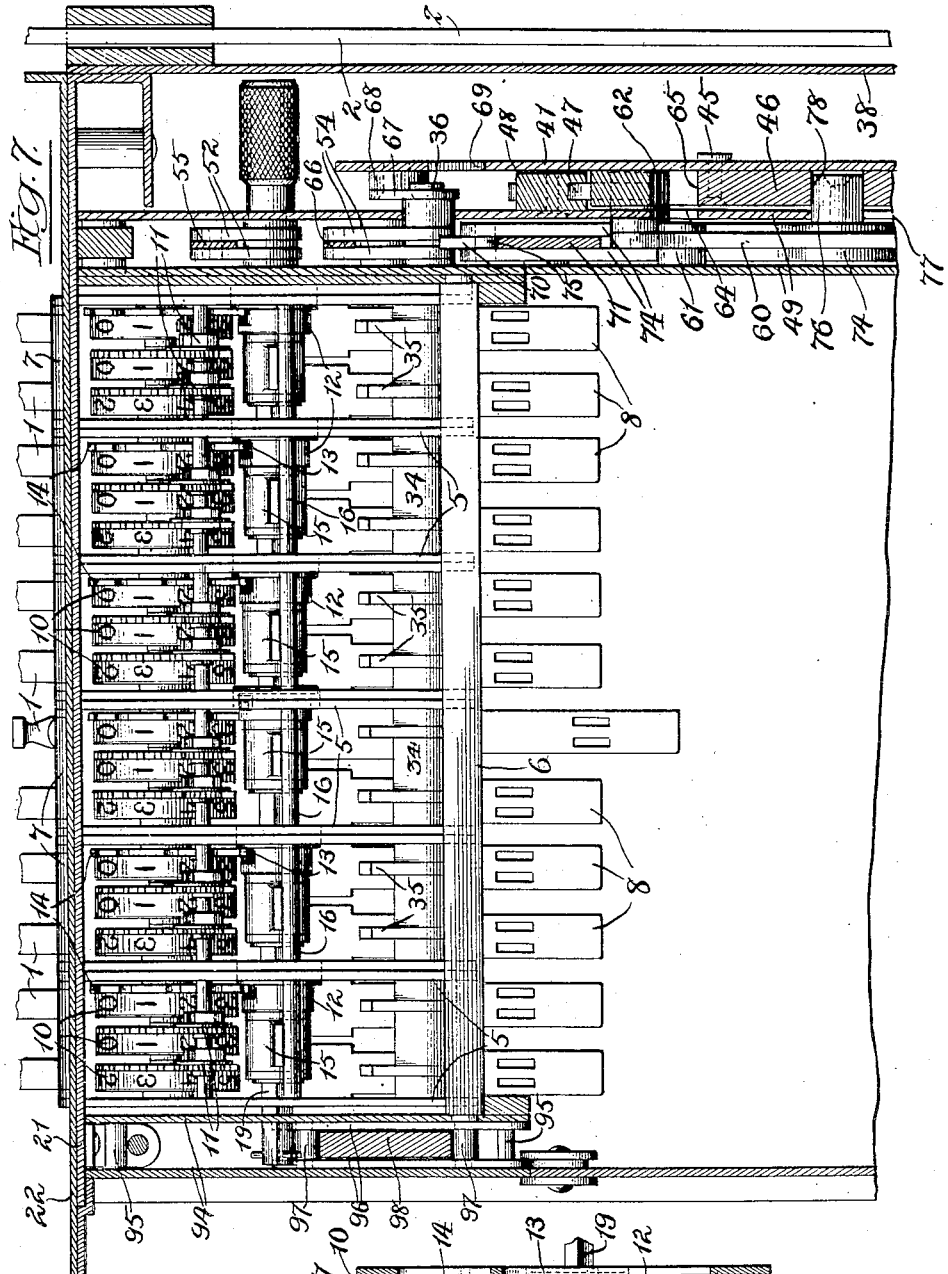

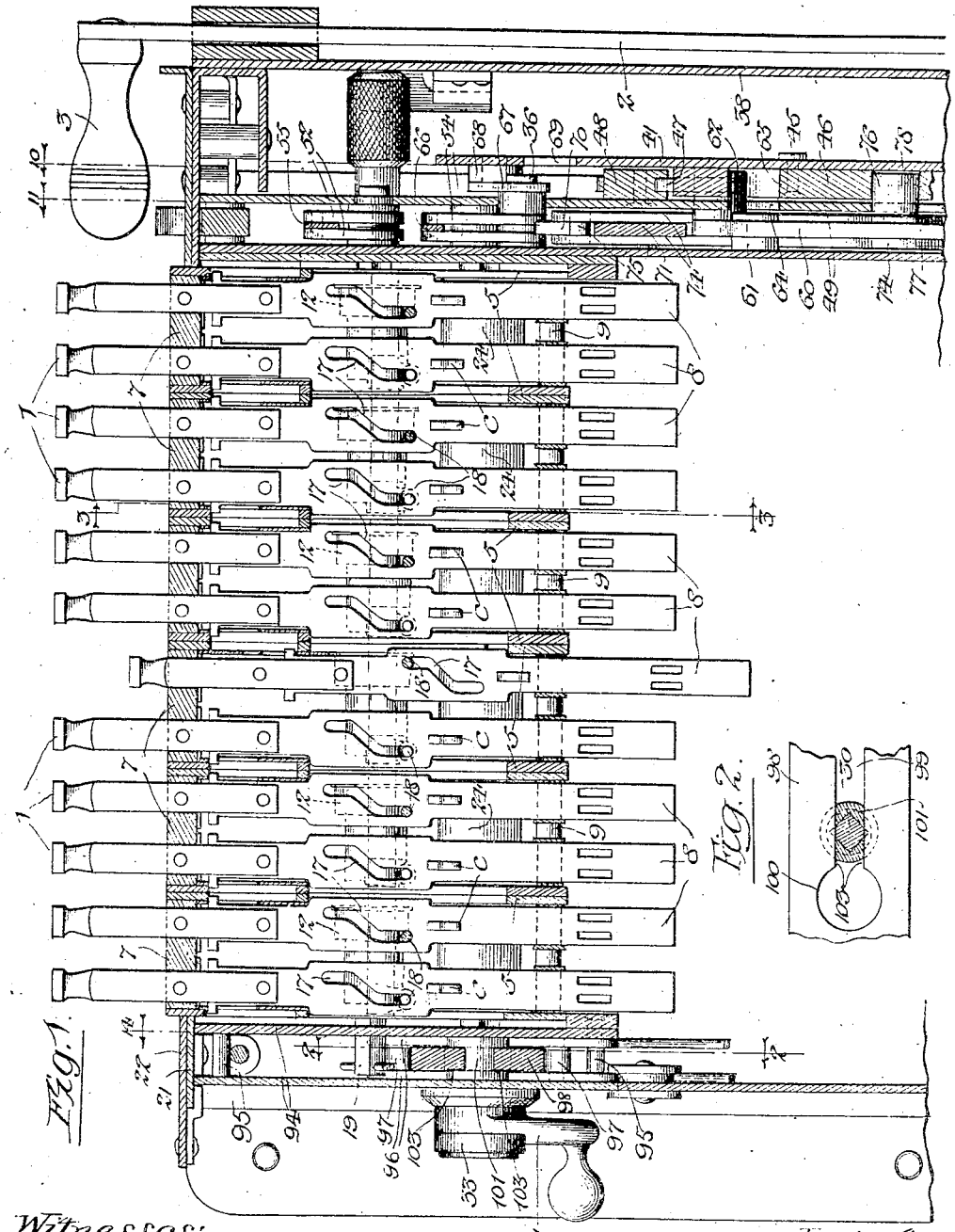

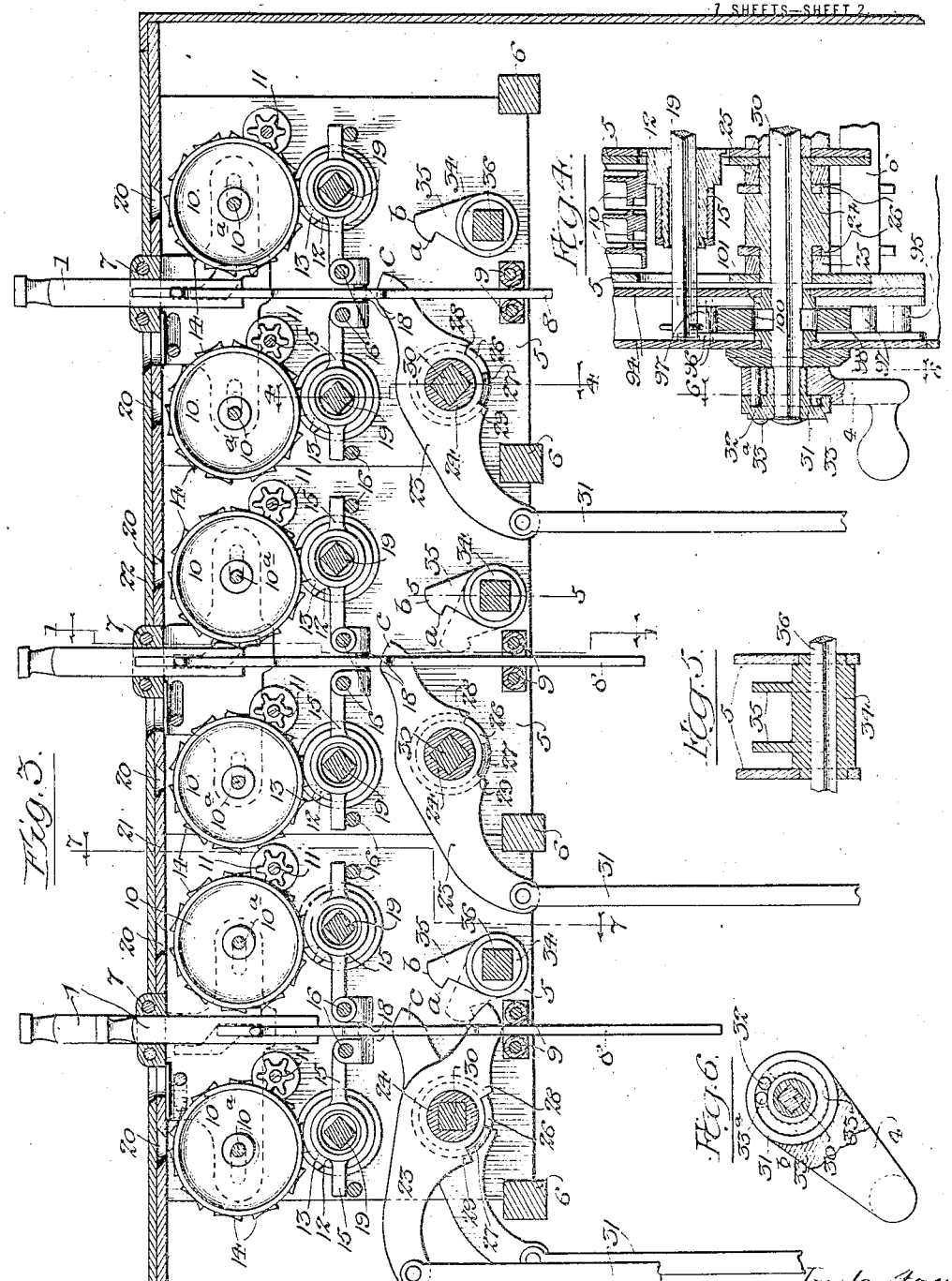

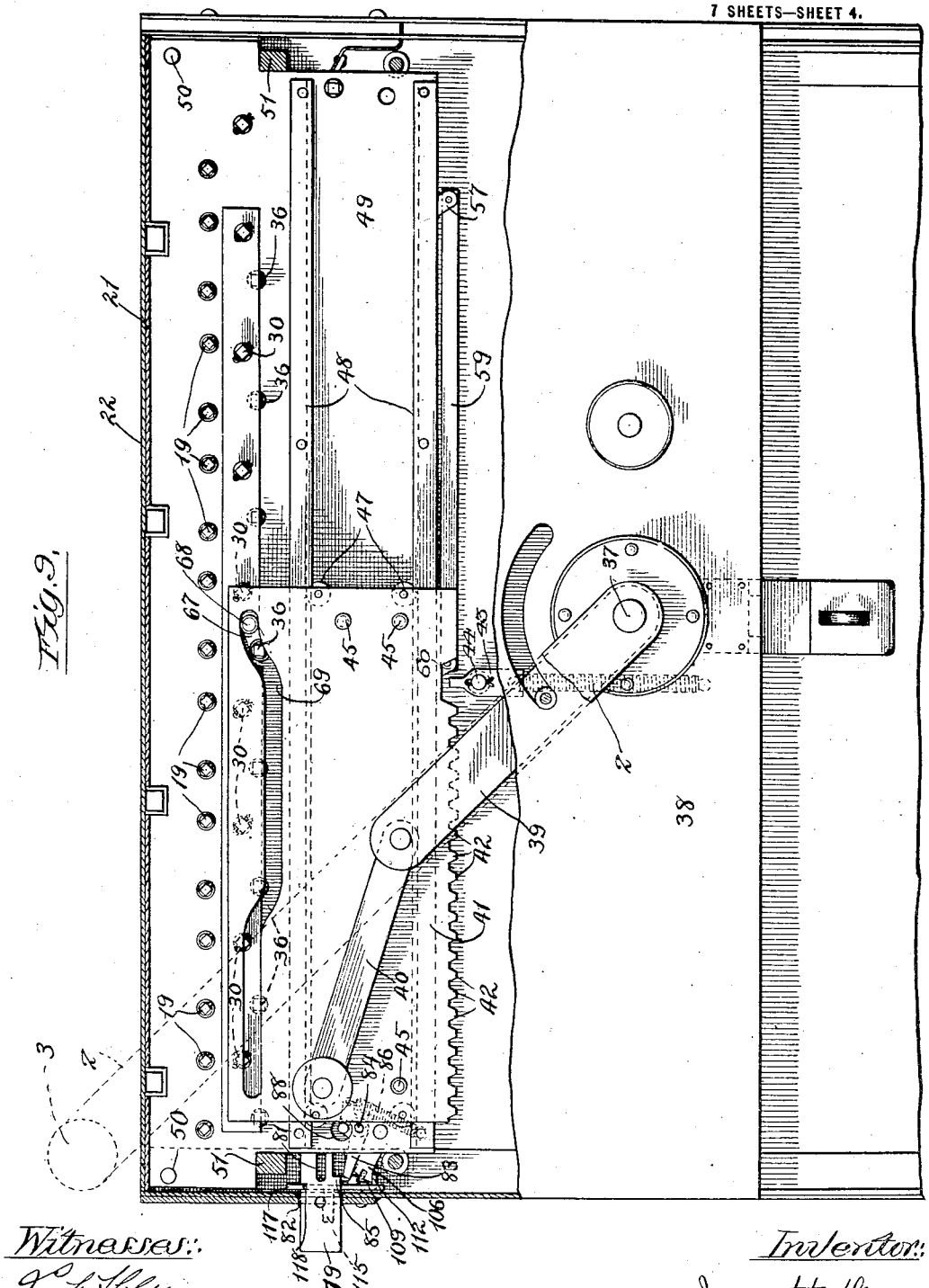

J. H. DEAN.
VOTING MACHINE.
APPLICATION FILED APR. 1, 1907. RENEWED MAR. 29, 1915.
1,158,643.
Patented Nov. 2, 1915.
7 SHEETS—SHEET 5.
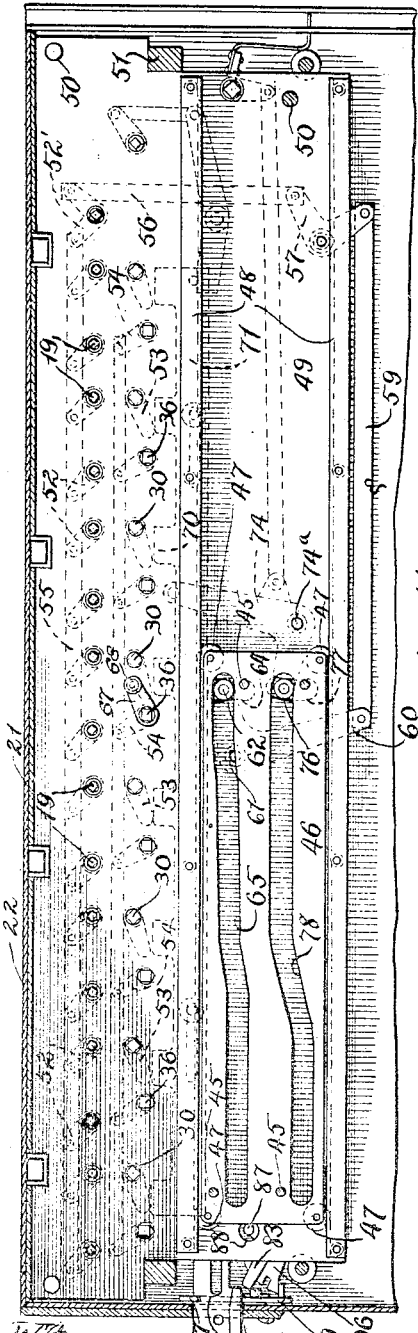
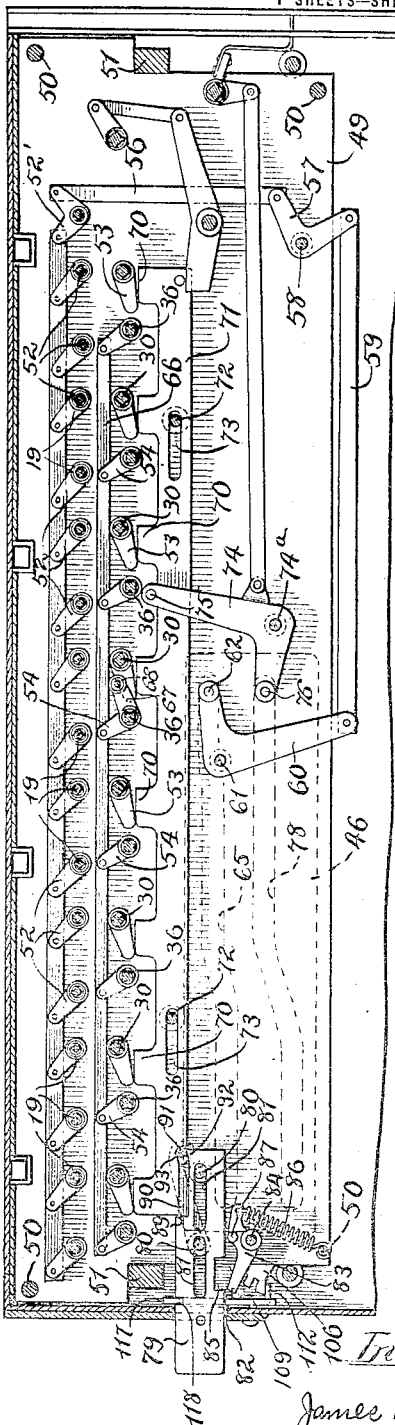

J. H. DEAN.
VOTING MACHINE.
APPLICATION FILED APR. 1, 1907. RENEWED MAR. 29, 1915.
1,158,643.
Patented Nov. 2, 1915.
7 SHEETS—SHEET 6.
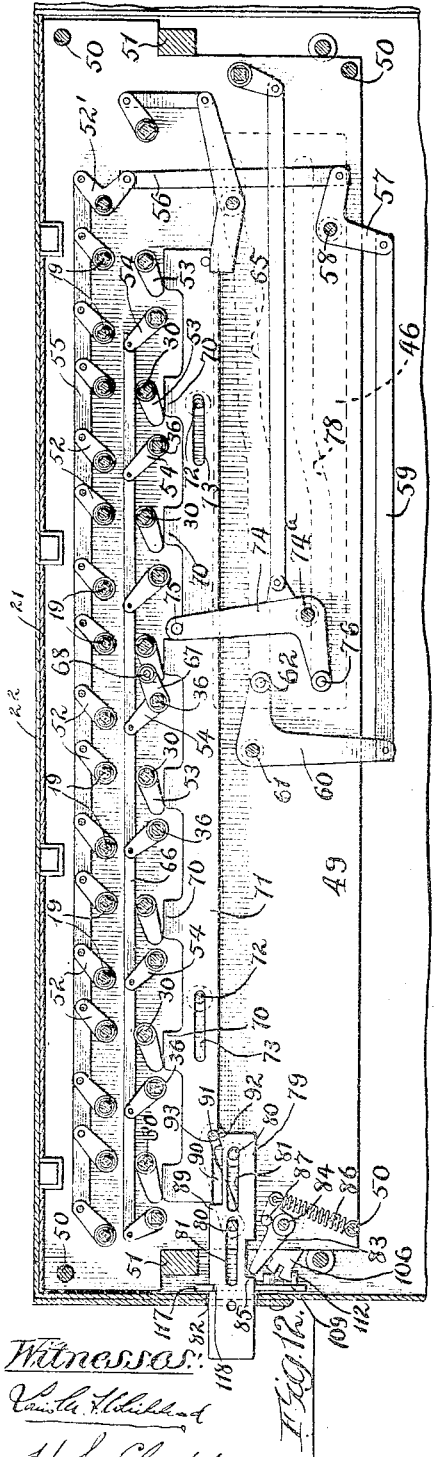
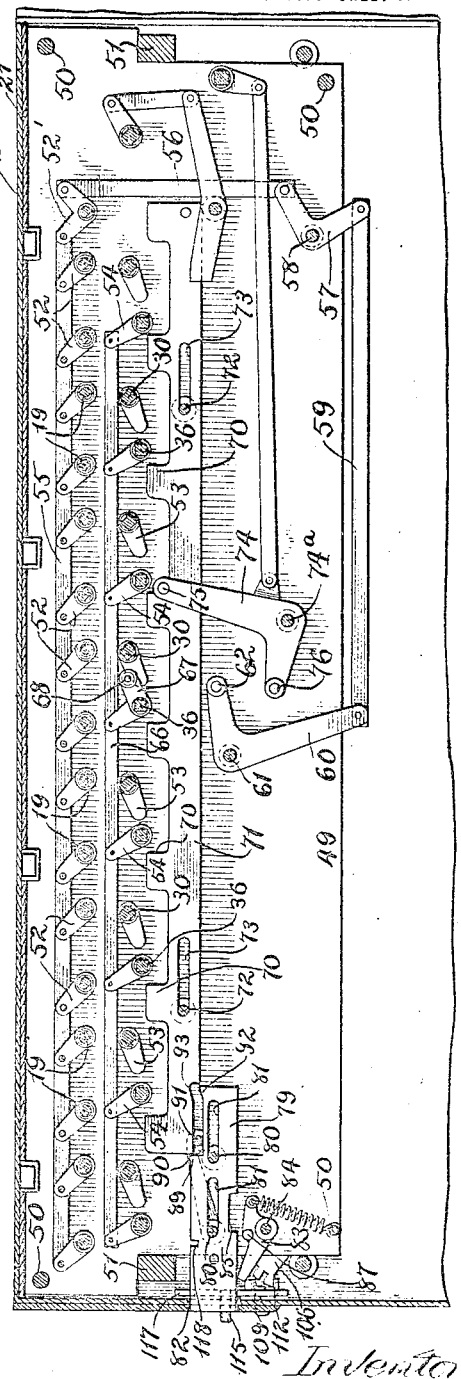

J. H. DEAN.
VOTING MACHINE.
APPLICATION FILED APR. 1, 1907. RENEWED MAR. 29, 1915.
1,158,643.
Patented Nov. 2, 1915.
7 SHEETS—SHEET 7.
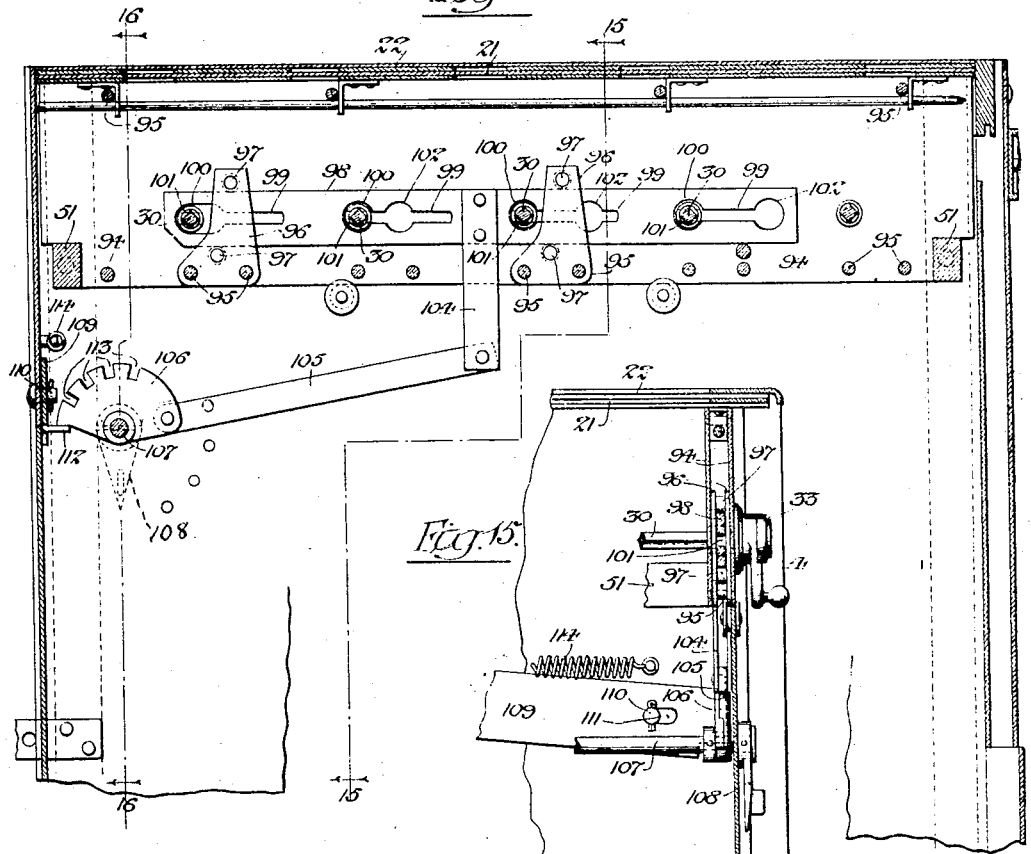
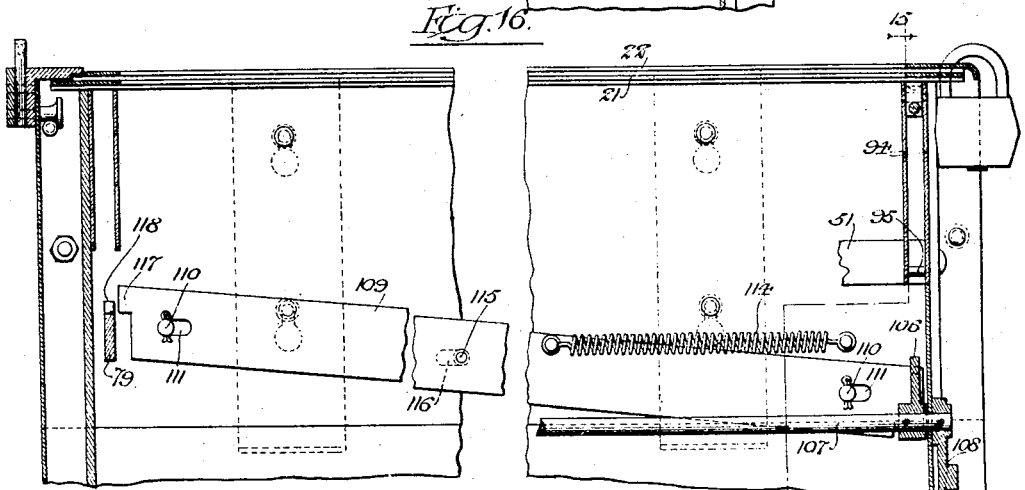
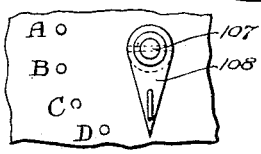

UNITED STATES PATENT OFFICE.

JAMES H. DEAN, OF CHICAGO, ILLINOIS, ASSIGNOR, BY MESNE ASSIGNMENTS TO EMPIRE VOTING MACHINE COMPANY, A CORPORATION OF NEW YORK.

VOTING-MACHINE.

1,158,643.   Specification of Letters Patent.   Patented Nov. 2, 1915.

Application filed April 1, 1907, Serial No. 365,639. Renewed March 29, 1915. Serial No. 17,892.

*To all whom it may concern:*

Be it known that I, JAMES H. DEAN, a citizen of the United States, and a resident of Chicago, county of Cook, and State of Illinois, have invented certain new and useful Improvements in Voting-Machines, of which the following is a specification.

The invention relates to voting machines and more particularly to improvements in the construction set forth in a prior application filed by me December 27, 1904, Serial No. 238,388, now Patent No. 1,013,646 of Jan. 2, 1912.

The invention seeks to provide improved forms of counter operating mechanism and of the controlling devices for the counter operating mechanism to insure the proper actuation of the vote counters or registers and prevent improper manipulation of the machine.

A further object of the invention is to provide means whereby the machine may be readily adapted for use at primary elections.

With these and other objects in view the invention consists in the features of construction, combinations and arrangements of parts hereinafter set forth, illustrated in the accompanying drawings and more particularly pointed out in the appended claims.

In the drawings Figure 1 is a vertical section from front to rear of the machine taken on the line 1—1 of Fig. 3. Fig. 2 is a detail section on the line 2—2 of Fig. 1. Fig. 3 is a cross section on the line 3—3 of Fig. 1. Fig. 4 is a detail section on the line 4—4 of Fig. 3. Fig. 5 is a detail section on the line 5—5 of Fig. 3. Fig. 6 is a detail view illustrating the connection between the straight ticket shaft and its operating handle. Fig. 7 is a longitudinal section of the machine from front to rear on the line 7—7 of Fig. 3. Fig. 8 is a detail view of one of the counter sections with certain parts broken away and parts shown in section. Fig. 9 is a rear view of the machine with a portion of the back plate broken away to show part of the operating mechanism. Fig. 10 is a section on line 10 of Fig. 1 with the ratchet plate removed and parts of the operating mechanism shown in dotted lines. Fig. 11 is a cross section on line 11 of Fig. 1 with the back plate of the main operating section removed to show the actuating cranks and levers. Figs. 12 and 13 are views similar to Fig. 11 but showing the operating mechanism in different positions. Fig. 14 is a section at the front of the machine on line 14 of Fig. 1 illustrating the primary mechanism. Fig. 15 is a detail section on the line 15—15 of Fig. 14. Fig. 16 is a detail section on line 16—16 of Fig. 14. Fig. 17 is a detail view illustrating the operating indicator for the primary mechanism.

As in the construction shown in the prior application, the frame of the machine is box-like in form, having the ballot or ticket upon its upper face through which the individual candidate keys 1 project. The operation of the machine is controlled by the voter through the medium of the main operating lever 2 at the back of the machine having a handle 3 at its upper end. The keys are arranged in columns from front to rear of the machine and the keys of any one row may be all controlled by means of a straight ticket key or handle 4 at the upper front portion of the machine.

The machine is constructed upon the unit or section system and each unit or section carries two keys and corresponding counters or registers therefor. These sections or units (see Figs. 1, 3, 7 and 8) comprise parallel plates 5 suitably connected together by cross rivets and are arranged within the upper portion of the machine upon a series of supports 6 that extend from front to rear. The two keys 1 of each section slide through a guide 7 at the upper portion and are provided with tail pieces 8 engaging guide rollers or pins 9 at the lower portion of the section or unit. The counters for the two keys are arranged on opposite sides of the keys and each comprises a set of three counting wheels 10 mounted on shafts 10$^a$ and connected by suitable transfer pinions 11. A Geneva stop actuator 12 is provided for each counter and is provided with a single tooth 13 arranged to engage the intermittent gear 14 on the units wheel of the corresponding counter. This actuator is rotatably mounted within the sleeve of the actuator shifter 15 and the actuator shifter is mounted to slide upon cross rivets 16 extending between the side plates 5 of the counter section, so that the tooth 13 of the actuator may be moved into and out of line with the gear 14 on the units wheel. Each key or tail piece 8 thereof is provided with a cam slot 17 (see Figs. 1 and 8) which engages a pin 18 on the corresponding actuator shifter so that as the key is moved vertically to and from voted position, the actuator will be shifted back and forth to move its tooth 13 into and out of line with the gear 14 on the units wheel of the counter. Normally, when the keys are in their raised or unvoted position, the tooth of the actuator is in line with the gear 14 of the counter, but when the key is shifted to its depressed or voted position, the tooth 13 of the corresponding actuator is moved out of line with the gear 14 of its counter.

The counter sections are arranged in line and a series of actuator rock shafts 19 extend through the rows of actuators and these shafts are connected together and operated to oscillate the actuators and advance the counters. That is to say, when the voter is admitted to the machine the shafts 19 are rocked and all of the counters of the machine are advanced one step. The voter then casts his ballot by depressing the proper number of keys and throwing the corresponding actuators out of operative relation with their counters so that when the shafts 19 are rocked back as the voter leaves the machine, the counters corresponding to the keys left in voted position remain advanced one step, while the other counters of the machine are turned back one step. The numbers of the counting wheels 10 may be viewed through suitable openings 20 in the top plate 21 (see Fig. 3). These openings are normally closed by a removable ballot plate 22 which carries the names of the several candidates opposite the corresponding keys, and which is removed at the end of the election to disclose the vote. The Geneva stop gear 14 of the units wheel is at all times interlocked with the Geneva stop actuator so that the counter cannot possibly be moved in any way except through the medium of the actuator.

Each key or its tail piece 8 is provided with an opening which engages the end of a corresponding rock arm 23. The rock arms of the two keys of each section are mounted to oscillate upon a hub 24 (see Figs. 3 and 4) that is provided with reduced ends suitably journaled in the side walls 5 of the unit section. The rock arms are suitably spaced apart from each other by an enlarged portion of the hub 24 and are suitably spaced from the side walls of the unit section by washers 25. The central enlarged portion of each hub 24 is provided at one point (see Figs. 3 and 4) with laterally projecting lugs 26 which extend within notches 27 formed on the lower edges of the rock arms and which lugs 26 are arranged to engage shoulders 28 and 29 on the rock arms at the ends of these notches. The notches 27 are double the width of the lugs 26, as shown in Fig. 3, so that a lost motion connection is formed between the hubs and the rock arms.

The hubs 24 are provided with square openings through which the locking and restoring shafts 30 extend. In the normal condition of the machine the shafts 30 are held in position with the lugs 26 of the hubs engaging the shoulders 28 of the rock arms and holding the keys 1 in their elevated or unvoted position. When the voter is admitted to the machine the shafts 30 are unlocked so that the voter may depress the keys. The number of keys which he may depress is of course limited by a suitable interlocking mechanism, the arrows or spreaders for which interlock are carried by depending rods 31 secured to the tail pieces of the rock arms 23. When the voter leaves the machine the shift of the shafts 30 brings the lugs 26 against the shoulders 28 of the rock arms 23, so that the latter are shifted to restore any of the keys which may have been shifted by the voter, together with their corresponding actuators to normal position and to lock them in such position. It is also obvious that the shafts 30 may be employed for shifting all of the keys in any one row to their depressed or voted position for straight ticket voting. For this purpose, each one of the shafts 30 extends through the front of the machine casing and is provided with an operating handle or crank 4 (see Fig. 1). Each of these handles is mounted to revolve on the reduced portion of a washer 31 that is fixed on the shaft (see Fig. 4) and is provided with a pin 32 engaging a segmental slot 33 in the washer, so as to form a one-way connection between the handle or crank and the shaft. The straight ticket handles or cranks 4 may be used to depress or move to voted position all of the keys in any one row, but cannot be used to restore the keys. The keys may however, be restored individually by the voter to correct or change his vote.

Each of the unit sections is provided on one side of the tail portions 8 of the keys with a hub 34, the reduced ends of which (see Fig. 5) are suitably journaled on the side plates 5 of the unit section. The hubs 24 carrying the rock arms 23 are journaled on opposite sides of the tail portions 8 of the keys. The hub 34 is provided with two dogs 35 as arranged in the planes of the rock arms 23 and provided on its end with sharpened points or knife edges $a$ and $b$ which are arranged to coöperate with the pointed ends $c$ of the corresponding rock arms. A series of shafts 36 extend through the hubs 34 of the unit sections and serve to oscillate the dogs 35 from the position shown in full lines in Fig. 3 to that shown in dotted lines. If the machine is carelessly operated by the voter he might depress a key part way only. If the key is depressed far enough to operate the interlocking mechanism and shift the corresponding actuator, the point or edge *a* of the dog 35, when the latter is locked, will engage the upper face of the pointed end *c* of the rock arm and complete the downward shift of the key, as indicated at the left hand end of Fig. 3. If the key is not depressed far enough to operate the interlocking mechanism and the corresponding actuator, the point or edge *b* of the dog 35 will, when the dog is oscillated, engage the under face of the pointed end *c* of the rock arm and restore the key to its unvoted position. It will be noted that the cam slots 17 in the keys (see Figs. 1 and 8) are provided with straight portions at their ends. This not only prevents the accidental displacement of the actuators when the keys are in either one of its extreme positions, but also necessitates that the key be depressed to a considerable extent before the corresponding actuator is shifted. As stated, if the key is depressed far enough to shift the actuator or partially shift the actuator, the corresponding dog 35 will engage the end of the rock arm 23 connected to the key and complete its movement so that the counter or registering mechanism will be properly operated, even though the keys be carelessly manipulated by the voter.

The operating or controlling lever 2 is fixed at its lower end to a short pivot shaft 37 which is journaled in a back plate 38 at the rear of the machine. Inside of the back plate 38 the pivot shaft 37 is provided with an arm 39 connected by a link 40 to a ratchet plate 41 (see Fig. 9). A full stroke mechanism for compelling the complete shift of the handle to one or the other side of the machine before its direction of movement can be reversed, comprises a series of ratchet teeth 42 on the lower edge of the plate 41 and a pawl 43 mounted on a stud 44 is normally spring-held in central position. The ratchet plate is fixed by a series of pins 45 to the outer face of a cam plate 46 (see Figs. 1, 7, 9 and 10). This cam plate is provided with rollers 47 engaging guide tracks 48 that are secured to the outer side of the main operating section. The main operating section (see Figs. 1, 7, 10 and 11) comprises two plates 49 spaced apart and secured together by studs 50. This operating section extends the full width of the machine and is arranged at the rear portion thereof upon two supports 51.

The main operating section is provided with three sets of crank arms 52, 53 and 54. These crank arms are mounted upon hubs which are suitably journaled in the front and back plates 49 of the operating section. These hubs are provided with suitable openings, square in the form shown to receive the ends of the three sets of shafts of the machine. The crank arms 52 engage the actuator shafts 19, the crank arms 53 engage the ends of the locking and restoring shafts 30 and the crank arms 54 engage the ends of the dog operating shafts 36. The actuator crank arms 52 are shown double in Fig. 7 and are pivoted at their ends with a common connecting rod 55 arranged between the two parts of the several rock arms. The end rock arm 52' is in the form of a bell crank and is connected by a link 56 to a bell crank 57 carried between the plates of the main operating section on a stud 58. This bell crank is connected by a link 59 to a bell crank 60 which is arranged between the plates of the main operating section on a cross stud 61. This bell crank is provided with a pin or roller 62 projecting through a slot 64 (see Fig. 10) in the front wall of the main operating section and engaging a cam slot 65 in the main operating cam 46. The rock arms 54 on the dog operating shafts 36 are also double (see Fig. 7) and are pivoted at their ends to a common connecting bar 66. One of the shafts 36 is provided on its end with a rock arm 67 having a pin or roller 68 which engages a cam slot 69 (see Fig. 9) in the upper portion of the ratchet plate 41.

The arms 53 on the ends of the locking and restoring shafts 36 are arranged to engage a series of lugs 70 on a locking and restoring bar 71. This bar is arranged to shift longitudinally upon a pair of studs 72 which extend between the plates 49 in the main operating section and through slots 73 in the bar. The bar 71 is shifted in one direction to restore and lock the keys by a bell crank 74, the upper portion of which is double or forked to embrace the bar, as shown in Fig. 7, and a cross pin 75 at its upper end is arranged to engage with one of the lugs 70 so that the bar 71 will be shifted with the bell crank 74 when the latter is moved from the position shown in Fig. 13 to that shown in Fig. 12. The locking and restoring bar 71 however will not move with the bell crank when the latter is shifted in the reverse direction. Bell crank 74 is provided with a pin or roller 76 which extends through a slot 77 (see Fig. 10) in the outer plate 49 of the main operating section and engages a cam slot 78 in the cam plate 46.

As stated, the locking and restoring bar 71 is shifted in one direction by the bell crank 74. It is shifted in the opposite direction by an intervening bar 79 under control of the judge or other officer of the election. This bar is mounted to slide between the plates 49 of the main operating section on a pair of cross studs 80 which extend through slots 81 in the bar. This bar is arranged as shown, at one end of the main operating section and extends through a slot 82 of the casing. It is normally locked in its extended position by a spring-held dog 83 mounted on a stud 84 and arranged to engage a notch 85 on the lower edge of the bar. The dog is pressed upwardly by a spring 86 into engagement with the notch 85. The dog is also provided with a pin 87 which projects through an opening 88 in the front wall of the main operating section and is arranged to be engaged by the edge of the ratchet plate 41 so that the dog or latch 83 may be tripped to release the intervening bar so that the latter may be thrust inwardly by the judge or other officer of election. When this is done a shoulder 89 on the intervening bar engages the end of the locking and restoring bar 71 and shifts the latter from the position shown in Fig. 12 to that shown in Fig. 13. A second controlling latch 90 for the intervening bar is mounted upon one of the studs 80 and carries a pin 91 which projects into the space between the inner end of the intervening bar and the outer end of the locking and restoring bar 71. The intervening bar is provided at its upper edge and at its inner end with an upwardly inclined shoulder 92 and the lower edge of the locking and restoring bar is provided with a corresponding upwardly inclined notch 93.

In the normal condition of the machine the operating or controlling lever 2 and the ratchet and cam plates 41 and 46 are at the left side of the machine or at the right when viewed from the rear, as in Figs. 9 to 13 inclusive. In Fig. 12 the cam plate is indicated at the right and with the parts in normal position. When the voter is admitted to the machine he grasps the handle 3 of the operating lever and shifts it to the position shown in Fig. 9. This correspondingly moves the ratchet plate 41 until it engages the pin 87 of the latch or dog 83 and releases the judge's intervening bar 79 and at the same time moves the cam plate 46 to the position indicated in Figs. 10 and 11. This movement of the cam plate through the medium of the bell crank 60 and connections will oscillate the actuator shafts from the position shown in Fig. 12 to that shown in Fig. 11 and will advance all of the counters of the machine one step, as previously described. The cam plate also shifts the bell crank 74 so as to move the pin 75 thereon away from the lug 70 on the locking and restoring bar 71 with which it engages. The keys of the machine however remain locked since the lugs 70 of the bar 71 are still in engagement with the rock arms 53 on the shafts 30 so that the keys cannot be moved because of the engagement of the shoulders 28 on the rock arms 23 with the lugs 26 on the hubs 24 that are connected with the shafts 30. The judge or other officer of election in control of the machine will then shift the intervening bar 79 inwardly to move the locking and restoring bar 71 from the position shown in Fig. 12 to that shown in Fig. 13. This of course, removes the lugs 70 on the interlocking bar in the path of movement of the arms 53 on the shafts 30 so that the voter may cast his ballot either by depressing the individual keys 1 or through the medium of the straight ticket keys or levers 4. It should be noted that after the judge has thrust the intervening bar inwardly he cannot thereafter withdraw the same, since the incline 92 on the inner end of the bar will engage the pin 91 on the latch 90, and this pin and latch are held depressed by the engagement therewith of the lower edge of the locking and restoring bar. The voter may correct or change his vote as desired by the manipulation of the individual keys, the number of keys which he can operate being properly limited by the interlocking mechanism. When he has once set the desired number of keys to the voted position, he will restore the ratchet plate 41 and cam plate 46 to normal and shift these parts from the position shown in Figs. 9, 10 and 11 to that shown in Fig. 12. This movement through the medium of the bell crank 60 will restore all of the actuator shafts and actuators and will restore all of the counters of the machine one step, except those corresponding with the keys which have been left in voted position. The bell crank 74 will also be shifted and the pin 75 thereon will shift the locking and restoring bar 71 to bring its lug 70 into engagement with the arms 53 of the locking and restoring shafts 30, so that these shafts will be moved to restore all of the keys of the machine to the normal unvoted position through the medium of the hubs 24 on the shafts and the rock arms 23 that are connected to the keys. The outward movement of the locking and restoring bar 71 will move the intervening bar 79 outwardly until the inclined shoulder 92 thereon engages the pin 91, but at this time the inclined notch 93 will be above the pin 91 so that the shoulder 92 may lift the pin, as shown in Fig. 12 and permit the complete outward shift of the intervening bar, in which position it is locked by the dog 83. It should be noted that the judge or other officer of election cannot thrust in the intervening bar and unlock the keys until the voter has completed the preliminary shift of the ratchet plate 41, cam plate 46 and parts controlled thereby.

It is obvious that if desired, the counter actuators 12 could be arranged with their teeth 13 normally out of line with the gears 14 on the units wheel of the counters, as set forth in the prior application referred to, instead of normally in line as set forth in the present application. In this case the preliminary shift of the controlling lever and operating cam would not affect the counters, but the restoring shift thereof would advance all of the counters corresponding to the keys left in voted position one step.

The cam slot 69 for shifting the dog operating shafts 36 is so shaped (see Fig. 9) that the dogs 35 are oscillated back and forth toward the corresponding keys and rock arms, both when the operating lever is shifted to unlock the machine and when it is returned to normal position. The dogs however only come into play during the restoring movement of the operating mechanism and then serve, as previously described, to complete the shift of any key which has been partially depressed if it has been depressed far enough to operate or partially operate its actuator, or to thrust the key back to its unvoted position if it has only been slightly depressed. The cam slot 69 is so positioned relatively to the cam slot 65 which controls the operation of the actuator shafts, that the dogs 35 are oscillated to complete the shift of any partially depressed key before the actuators are shifted and before the restoring shafts are shifted.

At the front of the machine is arranged a section (see Figs. 1, 14, 15 and 16) comprising plates 94 spaced from one another and connected by rivets or studs 95. This section extends the full width of the machine and is carried upon the supports 51. Sets of guide plates 96 carried on some of the studs 95 are arranged in pairs between the plates 94 and carry cross pins 97 between which is mounted a longitudinally shiftable or sliding bar 98. This bar is provided with a series of longitudinally extending slots 99 and these slots are provided at one end with enlargements 100 within which are arranged sleeves 101 upon the ends of the shafts 30. The enlargements 100 of the first slot at the end of the bar is slightly elongated, as shown, while the other notches are provided with enlargements 102 located respectively at different distances from the enlargements 100. The sleeves 101 on the shafts 30 are provided with locking notches 103 so that when the narrow part of the corresponding slot is brought into engagement therewith the shaft and the row or column of keys corresponding thereto is locked out of operation. It is obvious from the arrangement shown that by shifting the bar 98 one step to the left from the position shown in Fig. 14, that all of the shafts 30, with the exception of the first, will be locked against movement. By shifting the bar two steps all of the shafts, except the second, will be locked out of operation and so on by shifting the bar three or four steps, all of the shafts except the third or fourth will be held against movement. It is also obvious that the arrangement could be applied to any number of shafts corresponding to the party rows or columns of keys upon the face of the machine. In this way all of the keys except those belonging to any single party, may be locked against movement so that the machine may be employed in a preliminary election.

The bar 98 is provided with a depending arm 104 connected by a link 105 to a segment 106 mounted on a shaft 107. This shaft extends through the front of the machine casing and is provided with an operating handle and indicator 108. The face of the machine (see Fig. 17) is provided with a series of letters or other suitable means to indicate to the voter the position to which he should shift the operating arm or indicator 108 to set the machine at a primary election so that he may vote for the candidates of his party.

At the side of the machine is mounted a longitudinally shiftable bar 109 mounted on a pair of pins 110 that are fixed to the side of the machine casing and extend through slots 111 in the bar. This bar is provided at its forward end with a lug 112 which is arranged to engage the segment 106 to hold the primary mechanism against movement or which will engage with any one of a series of notches 113 to hold the primary mechanism against further movement after the voter has selected any one party. This locking bar 109 is normally held toward the segment 106 by a spring 114 but may be shifted against the tension of the spring to release the primary mechanism by means of a pin 115 which projects through a slot 116 in the side of the machine casing. At its rear end the locking bar 109 is provided with a shoulder or lug 117 which is arranged to engage a notch 118 in the judge's intervening bar 79. The notch 118 is only opposite the shoulder 117 on the bar 109 when the intervening bar is in its outermost position, as shown in Fig. 12, so that the primary mechanism can only be unlocked when the intervening bar is in this position.

At a primary election the voter will be admitted to the machine and will shift the operating lever, as described, so as to release the locking dog 83 for the intervening bar. The judge of election will then shift the locking bar 109 through the medium of the pin 115 thereon. In so doing, he will move the lug 117 on the bar into engagement with the slot 118 of the intervening bar, so that the latter cannot be moved inwardly to unlock the keys. The voter must then set the primary mechanism in accordance with the party for whose candidates he desires to vote, and the primary mechanism will be locked in this selected position by the engagement of the lug 112 on the bar 109 with one of the notches 113 of the segment 106. The primary mechanism must be locked in this manner before the intervening bar 79 can be released and before the latter can be pushed in to unlock the keys and permit the voter to cast his ballot. Moreover, after the intervening bar has once been pushed in the locking bar 109 cannot again be released to permit any change in the primary mechanism until after the parts of the machine are restored to normal position. It should also be noted that the intervening bar cannot be pulled out to permit any change in the primary mechanism until after the voter has cast his ballot and restored the main operating lever.

It is obvious that numerous changes may be made in the details of structure set forth without departure from the essentials of the invention.

Having described my invention, what I claim as new and desire to secure by Letters Patent is:

1. In a voting machine, the combination of a series of counters, a series of actuators normally in operative relation therewith, mechanism for shifting said actuators back and forth to advance and retract said counters one step, a series of push keys and cam devices intermediate said keys and actuators for shifting the latter into and out of operation with said counters.

2. In a voting machine, a Geneva stop counter comprising a set of wheels mounted on a common axis, a rotary Geneva stop actuator therefor normally in operative relation therewith, a push key extending at right-angles to the axes of said counter and actuator having a cam slot therein engaging the pin connected to said actuator to shift the latter out of operative relation with said counter when moved to voted position and means for oscillating said actuator to advance and retract said counter.

3. In a voting machine, the combination of a series of counters, a series of corresponding counter actuators, keys controlling said actuators, means engaging said keys for locking the keys either in voted or unvoted position and mechanism for operating said locking means and said actuators, said mechanism being arranged to first move said means to reset the keys or move them to voted position and hold them therein and to subsequently move the actuators.

4. In a voting machine, the combination of a series of counters, a corresponding series of counter actuators, a series of keys for shifting said actuators into and out of operative relation with said counters, dogs for completing the movement of any partially shifted key or keys, mechanism for operating said dogs, mechanism for operating said actuators and means for actuating said dog operating mechanism in advance of said actuator operating mechanism.

5. In a voting machine, the combination of a series of counters, a corresponding series of counter actuators, keys for shifting said counters and counter actuators into and out of operative relation, operating mechanism for effecting a relative shift between said counters and counter actuators to advance said counters, a series of dogs arranged to engage and complete the shift of any partially shifted key or keys and means controlled by said operating mechanism for shifting said dogs in advance of the registering movement of said counters.

6. In a voting machine, the combination of a series of counters, a corresponding set of rotary counter actuators, a set of shafts for oscillating said actuators to advance said counters, a set of keys connected to axially shift said actuators into and out of operative relation with said counters, a set of dogs for completing the movement of any partially shifted key or keys, a series of operating shafts for said dogs and operating mechanism for shifting said dog operating shafts and subsequently shifting said actuator shafts.

7. In a voting machine, the combination of a series of counters, actuators and keys therefor arranged in rows or columns, a set of shifting devices one for each row or column, rocking means for positively rocking said shifting devices in one direction, to restore and lock said keys in normal position, and a series of straight ticket keys having one way connections with said shifting devices for shifting them in the opposite direction, whereby any row or column of keys can be moved to voted position by its straight ticket key but can not be returned thereby.

8. In a voting machine, the combination of a series of counters, a series of controlling keys therefor, a universal oscillating shifting device having a two way lost motion connection with each of said keys, a party key having a one way connection with the said shifting device for moving the same in one direction to throw all the keys of its series to voted position, and mechanism for positively moving said shifting device in the opposite direction to restore and lock the keys of its series in initial position.

9. In a voting machine, the combination of a series of counters and counter controlling keys arranged in rows or party columns, a series of locking and restoring shafts for said keys and a set of straight ticket keys having one-way connections with said locking and restoring shafts.

10. In a voting machine, the combination of a series of counters, a series of counter controlling keys arranged in party rows or columns, a set of locking and restoring shafts having lost motion connections with said keys, a set of straight ticket keys having one-way connections with said shafts for shifting the same in one direction and moving the separate rows or columns of keys to voted position and mechanism for operating said shafts in the opposite direction to restore said keys to initial position.

11. In a voting machine, the combination of a series of counters, counter actuators and keys for shifting said actuators arranged in party rows or columns, a set of actuator operating shafts, a set of locking and restoring shafts for said keys, a set of straight ticket keys having one-way connections with said locking and restoring shafts and mechanism for oscillating said actuator shafts and for returning said locking and restoring shafts and keys to normal position.

12. In a voting machine, the combination of a series of counters, controlling keys therefor, a locking and restoring device for said keys, means under control of the judge or officer of election for shifting said locking and restoring device in one direction to release said keys and operating mechanism for shifting said device in the opposite direction to lock and restore said keys.

13. In a voting machine, the combination of a series of counters, a series of controlling keys therefor, a shiftable locking and restoring member for said keys, an intervening device under control of the judge of election having a one-way engagement with said member to shift the same in one direction to release the keys, operating mechanism under control of the voter for shifting said device in the opposite direction to restore said keys to initial position and a latch for said intervening device arranged to be tripped by said operating mechanism.

14. In a voting machine, the combination of a series of counters, a series of controlling keys therefor, locking and restoring shafts for said keys, a shiftable bar for actuating said shafts, a judge's intervening bar having one-way engagement with said locking and restoring bar for shifting the same in one direction and operating mechanism under control of the voter having a one-way engagement with said locking and restoring bar for shifting the same in the opposite direction.

15. In a voting machine, the combination of a series of counters, a series of controlling keys therefor, locking and restoring shafts for said keys, a shiftable bar for actuating said shafts, a judge's intervening bar having one-way engagement with said locking and restoring bar for shifting the same in one direction, operating mechanism under control of the voter having a one-way engagement with said locking and restoring bar for shifting the same in the opposite direction and a latch for said intervening bar arranged to be tripped by said operating mechanism.

16. In a voting machine, the combination of a series of counters, a series of controlling keys therefor, a shiftable locking and restoring bar for said keys, an intervening bar under control of the judge or officer of election having a one-way engagement with said locking and restoring bar to move the same in one direction to release the keys, mechanism under the control of the voter for shifting said bar in the opposite direction to restore the keys to initial position and means intermediate said restoring and intervening bars for preventing the releasing shift of said restoring bar independently of said intervening bar.

17. In a voting machine, the combination of a series of counters, controlling keys therefor arranged in rows or columns, primary voting mechanism progressively shiftable independently of said keys to prevent the operation of all but a predetermined set of said keys and means for locking said primary voting mechanism in set position.

18. In a voting machine, the combination of a series of counters, controlling keys therefor arranged in rows or columns, a primary voting device variably shiftable to a number of different positions to prevent the operation of certain of said rows or columns of keys while the remainder are left free for operation and means for locking said primary voting device in any one of its set positions.

19. In a voting machine, the combination of a series of counters, controlling keys therefor normally locked against movement, primary voting mechanism progressively shiftable independently of said keys to prevent the operation of all but a predetermined set of said keys, means for locking said primary voting mechanism in set position and means arranged to prevent the releasing of said keys for voting while said primary voting mechanism is unlocked.

20. In a voting machine, the combination of a series of counters, controlling keys therefor arranged in rows or columns and normally locked against movement, a device variably shiftable independently of said keys to a number of different positions to lock certain of said rows of keys for primary voting and means compelling the locking of said primary voting device in set position before the keys can be unlocked for voting.

21. In a voting machine, the combination of a series of counters, controlling keys therefor, mechanism for locking all but a predetermined set of said keys for primary voting, means for locking said primary voting mechanism in set position, mechanism for releasing said keys and restoring the same to initial position and means controlled by said mechanism for preventing the release of said primary voting mechanism until the keys have been restored.

22. In a voting machine, the combination of a series of counters, controlling keys therefor arranged in rows or columns, a variably shiftable bar for locking certain of said rows of keys for primary voting, a locking device for said bar, means for locking said keys and means interposed between the lock for said bar and the lock for said keys to prevent the release of said keys until said primary voting bar has been locked in set position and to prevent the release of said bar until said keys have been restored and locked in initial position.

23. In a voting machine, the combination of a series of counters, controlling keys therefor arranged in rows or columns, a variably shiftable bar for locking certain of said rows or columns of keys for primary voting, a locking and restoring device for said keys, a lock for said primary voting bar and an intervening device under control of the judge of election interposed between the lock for said primary voting bar and said locking and restoring device, said lock being arranged when released to prevent the shift of said intervening bar and said intervening bar being arranged to shift said locking and restoring device to permit the operation of the keys and when shifted to prevent the release of said lock.

24. In a voting machine, the combination of a series of counters, controlling keys therefor arranged in rows or columns, a set of locking and restoring shafts for said rows of keys, a variably shiftable bar coöperating with said shafts to prevent the operation of certain of said rows of keys for primary voting, a lock for holding said primary voting bar in set position, a locking and restoring bar for said keys coöperating with said shafts and means interposed between said locking and restoring bar and the lock for said primary voting bar arranged to prevent the unlocking of said keys when said primary voting bar is unlocked and to prevent the release of said primary voting bar until said keys have been restored and locked in initial position.

25. In a voting machine, the combination of a series of counters, controlling keys therefor arranged in rows, a set of locking and restoring shafts for said keys one for each row, a variably shiftable bar mounted on said shafts and having surfaces for variably locking said shafts when shifted to different positions.

26. In voting machines, the combination of a series of counters, counter-actuators normally in operative relation therewith, a series of push keys extending at right-angles to the axes of said counters and counter-actuators arranged to shift the same into and out of operative relation, mechanism coöperating with said counters and counter-actuators to advance all of said counters one step when the voter is admitted to the machine and to retract all of the counters one step except those corresponding to the keys that are left in voted position.

27. In a voting machine, the combination with a series of counters, a series of counter actuators, voters' keys for controlling the operation of said actuators upon said counters, mechanism for completing the operation of said actuators and counters and means for locking said keys either in voted or unvoted position during the operation of said actuators.

28. In a voting machine, the combination with a series of counters, a corresponding series of counter actuators, voters' keys controlling the operation of said counters upon said actuators, said keys being shiftable to and from voted position to correct or change a vote, mechanism for completing the operation of said counters and actuators to register a vote for each key left in voted position, and means controlled by said mechanism for positively locking the keys either in voted or unvoted position during the operation of said mechanism.

29. In a voting machine, the combination with a series of counters, a corresponding series of counter actuators, a set of voter's keys movable to and from voted position to throw said counters and actuators into and out of operative relation, mechanism for completing the operation of said counters and actuators to register a vote for each key left by the voter in voted position and means for locking said keys either in voted or unvoted position during the operation of said mechanism, substantially as described.

30. In a voting machine, the combination with a series of counters, a series of counter actuators, said counters and said actuators being relatively shiftable in one direction into and out of operative relation and relatively shiftable in another direction to effect the operation of said actuators upon said counters, said actuators being normally in operative relation with said counters, a series of keys for shifting said actuators out of operative relation with said counters when said keys are moved to voted position and operating mechanism controlling the relative shift of said actuators and counters to advance and retract the latter one step.

31. The combination in a voting machine of a series of counters and keys and actuators therefor, a motor device for said machine, said motor normally driving all of said counters through their actuators forward and back one number for each complete operation of the machine.

32. The combination in a voting machine of a series of counters and keys and actuators therefor, a motor device for said machine, said motor normally driving all of said counters through their actuators forward and back one number for each complete operation of the machine, each of said keys being operable after its counter has been driven forward to prevent its being driven backward.

33. The combination in a voting machine of keys arranged in a series of parallel rows, a bar for holding the keys in each row locked, a locking bar moving transversely to said bars and releasing each one in turn and holding the remaining bars locked, whereby each row of keys may be separately unlocked for voting operation.

34. A voting machine primary lockout comprising party rows of voting devices, a bar for each party row, a bar at right angles to said bars and having means to contact therewith, said bar being longitudinally and progressively movable to successively release one or more and lock the rest of said bars.

35. A voting machine primary lockout comprising party rows of voting devices, a bar at right angles to said rows of voting devices and intermediate connections whereby a longitudinal progressive movement of said bar may progressively release the voting devices of each party and lock the rest.

JAMES H. DEAN.

Witnesses:
MAE C. LINDAUER,
LILLIAN PRENTICE.